United States Patent [19]

McGarry et al.

[11] Patent Number: 4,461,843

[45] Date of Patent: Jul. 24, 1984

[54] PROCESSES FOR PREPARING NOVEL BADDELEYITE REFRACTORY ARTICLES

[75] Inventors: Charles N. McGarry, Clarksville, Ind.; Janet Stunis, Louisville, Ky.; Thomas M. Wehrenberg, Jeffersonville, Ind.

[73] Assignee: Corning Glass Works, Corning, N.Y.

[21] Appl. No.: 416,318

[22] Filed: Sep. 9, 1982

[51] Int. Cl.³ .............................................. C04B 35/48
[52] U.S. Cl. .................................. 501/102; 501/103; 501/104; 501/105
[58] Field of Search ................ 501/102, 103, 104, 105

[56] References Cited

U.S. PATENT DOCUMENTS 3,929,498  12/1975  Hancock et al. ..................... 501/103

OTHER PUBLICATIONS

Zircoa-Spec 3000 Nozzles-Corning Glass Works.
Zircoa Nozzles-Product Bulletin No. 25-Corning Glass Works.
Zircoa-Zirconium Oxide Tundish Nozzles-Product Bulletin 2/1980-Corning Glass.
Ceramics for Continuous Casting-LECO (Tundish Nozzles and Ladle Inner Nozzles).
Zirconia Tundish Nozzles-LECO-1975.

*Primary Examiner*—James Poer
*Attorney, Agent, or Firm*—John Jamieson, Jr.; R. N. Wardell

[57] ABSTRACT

A novel process for fabricating novel high zirconia content refractory articles directly from novel sinterable compositions including as the major ingredient thereof baddeleyite ore concentrates thereby reducing costs. Appropriate additives, particularly zircon, further provide enhanced resistance to thermal shock damage. Plasticizers, binders and other processing aids are identified for press forming exemplary compositions into continuous casting nozzles, shrouds and other ceramic products typically used in the processing of molten steel, specialty metals and glass.

33 Claims, 1 Drawing Figure

PROCESSES FOR PREPARING NOVEL BADDELEYITE REFRACTORY ARTICLES

FIELD OF THE INVENTION

The invention relates to novel refractory articles having improved thermal shock resistance and novel processes for preparing the same and in particular to the preparation of high zirconia content refractory articles directly from baddeleyite, in particle sizes in which that mineral is typically provided after being separated and concentrated from ore, in combination with additives to enhance bonding and resistance to thermal shock damage.

BACKGROUND OF THE INVENTION

Nozzles, shrouds, sleeves, slide gates and other metal contact parts used in the processing of molten steel, steel superalloys and other specialty metals, and glass are typically manufactured from ceramic materials. Because of its high resistance to erosion from molten steel and the like, purified zirconium dioxide ($ZrO_2$), zirconia, is a preferred component for fabricating such metal processing articles. Zirconia is typically purified for refractory purposes (to approximately 99% $ZrO_2+HfO_2$) from zircon sand using either electrical or thermochemical processes. This material is hereinafter referred to as artificial zirconia to distinguish it from zircon sand, baddeleyite and other naturally occurring forms of zirconia. The electrical process permits the manufacture of large aggregates of purified zirconia which may be crushed to provide a wide range of aggregate piece sizes ranging upwards to several millimeters in diameter desired to achieve good particle packing and high density (i.e. lack of porosity) in the articles formed therefrom. The thermochemical process produces a fine zirconia flour which is typically aggregated by preforming into larger shapes such as dobie type bricks and sintering to high density. The bricks or other shapes are thereafter crushed to produce coarse grain artificial zirconia aggregate. However, the costs involved in refining artificial zirconia from zircon sand and sizing the refined material into appropriate sized aggregate pieces is reflected in the cost of the articles produced.

Baddeleyite is a naturally occurring mineral and by using heavy minerals separation techniques may be concentrated up to 96% or more by weight of zirconium dioxide with traces of hafnium dioxide. Some refractory articles have been made from baddeleyite ore concentrates, but these articles have been limited to fine grained bodies made entirely or almost entirely with materials having effective particle sizes of less than about five microns and, in any event, having no particles greater than about 20 microns. Two exemplary compositions for fabricating such articles are described in U.S. Pat. No. 3,929,498 to Hancock et al. The average particle size of the composition ingredients were less than about 2 microns and of the particles of the sintered aggregate, apart from the aggregation, about 5 to 15 microns. These articles exhibit good resistance to erosion but poor resistance to damage from thermal shock when compared to the performance of comparable articles manufactured from coarse grain (i.e. a millimeter or more in diameter) artificial zirconia.

It has been proposed to use fused baddeleyite concentrates aggregate for fabricating refractory articles. Fused baddeleyite is formed by heating the baddeleyite ore concentrates to a liquid state and then allowing the liquid to cool. It is believed that some form of calcia or other known zirconia stabilizing compositions are typically added to the baddeleyite before melting. The resolidified material is then remilled to provide an assortment of particle sizes including particles several times larger than the largest baddeleyite particles recovered in concentrating the mineral from its ore. While less expensive than artificial zirconia, the steps of melting and subsequently remilling the baddeleyite again add to the cost of the articles produced from the fused material.

It is well known that zirconia in either its naturally occurring or artificial form undergo a 3.8% volume change accompanying a change in phase from a monoclinic to a tetragonal structure at about 1160° C. Phase and structure will be hereinafter referred to interchangeably. To prevent this destructive volume change in dense, very high zirconia content bodies, it is known to stabilize the zirconia by converting it into a cubic phase during sintering, through the addition of zirconia stabilizing compositions. Compositions used for this purpose include yttria ($Y_2O_3$), magnesia (MgO) and calcium carbonate which reacts on mild heating to release calcia (CaO) the actual stabilizing agent. The cubic phase formed is stable between room temperature and the melting point of the zirconia (approximately 2700° C.).

Baddeleyite ore concentrates, both fused and unfused, can be distinguished from artificial zirconia prepared by the electrical or thermochemical processes referred to earlier and from other forms of purified zirconia on the basis of uranium 238 and thorium 232 content. Baddeleyite ore concentrates typically contain from about 0.05 to 0.20% by weight uranium 238 and thorium 232 while artificial zirconia contains less than about 0.05% and typically about 0.03% or less uranium 238 and thorium 232.

Additionally, fused baddeleyite may be distinguished from baddeleyite ore concentrates in that gas bubbles and voids are typically formed in the former during the fusing operation. Particles of fused baddeleyite have a "swiss cheese" appearance; that is to say, the particles are characteristically very dense (i.e. non-porous) but with occasional smooth rounded voids or holes. Fused baddeleyite is also often distinguished by microcracks and fissures within the grains from rapid cooling after fusing. These holes, fissures and microcracks are readily ascertainable upon microscopic examination at a magnification of about 50 power and are not apparent in unmelted baddeleyite ore concentrates.

OBJECTS OF THE INVENTION

It is a principal object of this invention to provide a process for fabricating refractory articles having a high zirconia content directly from baddeleyite ore concentrates whereby material costs are substantially reduced.

It is yet another object of this invention to provide a composition for sintering which may be used in the fabrication of refractory articles having a high zirconia content, exhibiting superior thermal shock capability and erosion resistance to molten steel, slag, glass and the like, and having as a substantial constituent thereof, naturally occurring baddeleyite whereby the use of artificial zirconia or melted baddeleyite aggregate may be reduced or entirely avoided and the costs of such articles thereby reduced.

It is yet another object of this invention to provide high zirconia content refractory articles produced directly from naturally occurring baddeleyite, which articles have thermal shock resistance capability comparable or substantially superior to that of articles formed from the more expensive coarse grain artificial zirconia.

SUMMARY OF THE INVENTION

In one aspect, the invention comprises sinterable refractory compositions, each composition comprising a major proportion by weight of unmelted baddeleyite and a major proportion by weight of the unmelted baddeleyite being in the form of particles having effective particle sizes greater than about 5 microns. It is believed that a major failing of others in attempting to form sintered articles directly from baddeleyite ore concentrates has been in not utilizing sufficiently large particles of baddeleyite to achieve heterogeneity, microcracking at the grain bounderies and other properties necessary for good resistance to thermal shock damage. A significant feature of this aspect of the invention is that the refractory composition further comprises a thermally decomposable composition decomposing at a temperature above about 100° C. and below the sintering temperature of the composition (about 1675° C.) into an oxide of zirconium in an amount effective to improve the thermal shock resistance of an article sintered from said refractory composition. It is believed that thermally decomposable compounds decomposing into an oxide of hafnium may also be effectively employed. Zircon is the preferred thermally decomposable composition of the invention. One percent zircon is included among the ceramifiable components of the some of the exemplary refractory compositions of the invention. However, it is envisioned that up to 5 percent may be effectively employed in certain application.

Further according to this aspect of the invention, a zirconia stabilizing composition in an amount effective to convert a portion of the zirconium dioxide present in said refractory composition into a cubic phase during sintering is added to the refractory composition. The preferred zirconia stabilizing composition is magnesium oxide, although calcium carbonate (providing calcium oxide), yttria, and other known zirconia stabilizing compositions may be employed. Stabilized zirconium oxide remains in a cubic phase at a temperature below about 1100° C. where non-stabilized zirconium dioxide enters to a monoclinic phase with an attendant significant volume change. Refractory compositions of the present invention typically also comprise a stabilizer diffusing composition for diffusing the zirconia stabilizing composition into the near theoretically dense baddeleyite particles in an amount effective to increase the amount of zirconium dioxide stabilized to a cubic phase by said zirconia stabilizing composition when said refractory composition is sintered. Preferably to according to the present invention, the stabilizer diffusing composition is selected from the group consisting of alumina, silica and mixtures thereof.

In described exemplary compositions of the invention, one ceramifiable component is aggregate containing at least a major portion by weight of unmelted baddeleyite and milled from rejected refractory articles having a high baddeleyite ore concentrates content, such as articles sintered from any of the described exemplary compositions of the invention. Also a minor proportion by weight of artificial zirconia is provided in many of the described exemplary embodiments of the invention as a fine grained zirconium dioxide component. However if desired, a fine grain baddeleyite ore concentrates fraction may be substituted further reducing the cost of providing the composition.

A second aspect of the invention is refractory articles formed by sintering refractory compositions of the present invention. Such articles comprise a sintered aggregation of particles, and it is believed that at least a major proportion by weight of the aggregation is particles of unmelted baddeleyite having effective particle sizes, apart from the aggregation, greater than about 15 microns. An important feature of this aspect of the invention is that the unmelted baddeleyite particles present are not so large as particles typically found in coarse grain ceramic articles conventionally formed from artificial zirconia or the like. According to the invention, at least a major proportion by weight of said unmelted baddeleyite particles of the aggregate have effective particle sizes, apart from the aggregation, of less than about 150 microns. Moreover, according to the invention, substantially all of the particles of the aggregate have effective particle sizes, apart from the aggregation, of less than about 260 microns. Substantially all of the particles, as used in this case, means all of the aggregate except the largest particles constituting less than about 10% by weight of the aggregate. At least a minor portion of the zirconium dioxide present in the sintered aggregate forming the article has a cubic structure. Sintered aggregate of the described exemplary compositions of the invention typically contains 42 to 48 percent stabilized (i.e. cubic phase) zirconia but extremes of 20 to 80 percent have been observed, on occasion. Furthermore, the aggregate forming articles of the present invention comprises in addition to discernable baddeleyite grains, a near continuous phase ceramic material bonding to grains. This material of the aggregate contains minor secondary phases of alumina, silica and combinations thereof. The continuous phase ceramic material is believed to be formed by solid state reaction of the fine grained ceramifiable constituents of the refractory composition.

A third aspect of the invention is a process for producing high zirconia content refractory articles and comprises using sinterable, refractory compositions of the present invention. According to this aspect of the invention, refractory articles are produced by providing a sinterable refractory composition comprising at least a major proportion by weight of unmelted baddeleyite, at least a major proportion by weight of said baddeleyite being present in the form of particles having effective particle sizes greater than about 5 microns; forming said composition into a shape; and heating said shape to a temperature and for a time sufficient substantially to sinter the shaped composition into a unitary mass to provide the article. As explained previously, preferably the compositions provided in this method comprise a thermally decomposable composition, decomposable into an oxide of zirconium or hafnium below said temperature, in an amount effective to improve the resistance of the article to thermal shock damage. Preferably, zircon, which dissociates into zirconia and silica, is provided. Also according to this aspect of the invention, the sinterable refractory composition provided further comprises an amount of a zirconia stabilizing composition effective to convert at least a portion of the zirconium dioxide in said composition to a cubic phase. The zirconium dioxide is present in the baddeleyite and in the artificial zirconia, and zircon if used. The preferred zirconia stabilizing composition is magnesium oxide, but calcium carbonate (supplying calcium oxide) and, it is believed, yttria and other known zirconia stabilizing agents and mixtures thereof, may be effectively used. The sinterable refractory compositions provided typically further comprise a minor proportion by weight of artificial zirconia but fine grain baddeleyite ore concentrates may be substituted therefor, if desired. Typically, the refractory composition provided is in the form of a mixture of solid particles and a liquid for forming and essentially all of the solid particles present in the refractory composition have effective particle sizes less than about 700 microns. Less than 3 percent of the coarse baddeleyite ore concentrate particles are the only ingredient of the described sinterable compositions which typically exceed this figure. Refractory articles has been successfully formed by pressing the refractory compositions of the present invention into article shapes, although it is envisioned that other standard methods of forming refractory article shapes including extrusion, casting and the like may be used to practice the invention. The sinterable refractory composition typically includes a binding composition in an amount effective to improve the formability of the refractory composition. A cellulose ether such as methyl cellulose has been effectively used. When said heating step is properly performed, a minor proportion of the composition, the smallest ceramifiable components, diffuse into a near continuous phase ceramic material bonded to the remaining larger baddeleyite particles. Preferably the step of heating is accomplished by heating the article throughout to a temperature of at least about 1675° C.

DETAILED DESCRIPTION OF THE INVENTION

Figure 1:
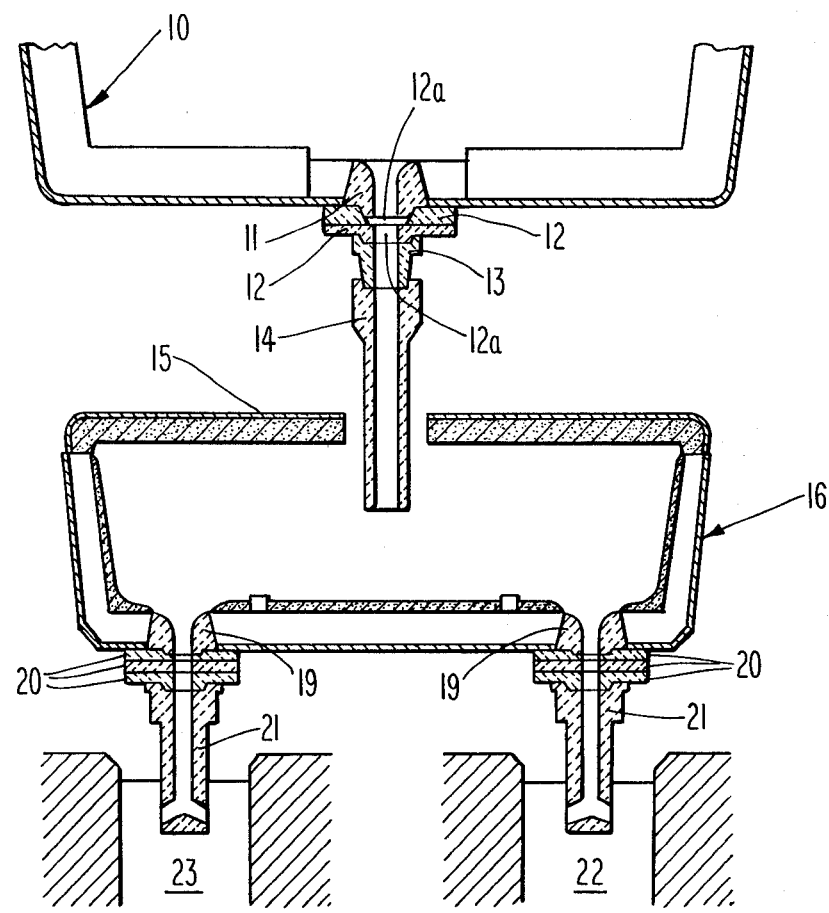
FIG. 1 depicts diagrammatically the use of various articles fabricated according to present invention in the processing of steel or other molten metals.

The invention relates to direct bonding of zirconium dioxide predominantly or entirely in the form of baddeleyite ore concentrates into a refractory material exhibiting high corrosion/erosion resistance to molten steel, slag, glass and the like, as well as improved resistance to damage from thermal shock when compared to the performance of prior bonded baddeleyite bodies. The refractory products of the present invention are designed for such applications as molten metal casting nozzles of various types, sliding gate valves and components thereof, air seal pipes or shrouds, pocket blocks, sleeves and other parts such as crucibles and bricks which are subject to molten metal, slag or glass corrosion/erosion environments.

Depicted diagrammatically in FIG. 1 are some of the articles used in casting steel and other metals. The steel is typically contained in a ladle 10 and for casting is passed through a ladle nozzle 11 inserted in the base of the ladle 10. Flow through the nozzle 11 is controlled by means of slide plates 12 forming a slide gate valve. When the slide plates 12 are properly aligned, molten metal passes through bores 12a in the plates 12, a collector nozzle 13 and an air seal pipe or shroud 14 into a tundish 16. The shroud 14 prevent air from reaching and oxidizing the molten metal as does a cover 15 of the tundish 16. The tundish 16 is supplied with inserted continuous casting nozzles 19, slide plates 20 and shrouds 21 similar to the nozzle 11, plates 12 and shroud 14 of the ladle 10 to control the flow of molten metal into the individual molds 22 and 23, respectively. The slide plates 12 and 20, shrouds 14 and 21 and various nozzles 11, 13 and 19, are typical metal contact articles which may be fabricated by means of the present invention. The form and function of these articles are well known to those skilled in the molten metal processing art as well as to those in the ceramic arts supplying such products. The highest quality articles of this type are typically made from stabilized purified coarse grain zirconia (artificial zirconia) which offers both high resistance to corrosion/erosion wear and damage due to thermal shock. Lesser quality parts are typically made from zircon, fused silica, fine grain baddeleyite and alumina/graphite compositions.

Set forth in columns A through J of Table 1 are the "ceramifiable components" of ten exemplary refractory compositions of the present invention. Each of the 10 columns (A through J) indicates the percentage by weight portion of each of the ceramifiable ingredients listed along the left hand margin which are present in the particular composition identified by the column. Each column totals 100%. The term "ceramifiable component" is meant to include each component of the refractory composition (A-J.) which remains entirely or substantially in the composition after its sintering, either as individual particles or parts of the individual particles or as the component of a material bonding the particles to one another. Plasticizing agents, binding agents or the like are added to the ceramifiable components of each column in order that the composition may be formed into an article shape and retained in that shape during sintering. The identified compositions have been pressed into continuous casting nozzles, shrouds, and other relatively small sized refractory articles (i.e. less than about 15 lbs. or 6.8 kilograms) used in steel and specialty metal fabrication. It is envisioned that larger articles shapes may be formed using the identified compositions of Table 1 in combination with other appropriate binders, plasticizers and forming aids.

For pressing article shapes from the exemplary refractory compositions of Table 1, water, in amounts of between about 3% and 5% and preferably about 4% ($\pm$0.5%), is added as a plasticizer. Between about 0.5% and 2.0% and preferably about 1.5% A-type methyl cellulose (3200–4800 centipoise) is also added as a binder and plastisizer. It is believed that other cellulose ethers may be effectively employed. Lastly, up to about 0.5% ceramic flour, an organic starch such as corn starch, may be additionally added as a binder. Each of the percentages identified for the water, methyl cellulose and ceramic flour ingredients are by weight and are with respect to and in addition to the 100% by weight ceramifiable ingredients of each composition. Each of these additives is a "non-ceramifiable component" of the refractory composition as it is substantially or entirely vaporized, burned out, or otherwise driven out of the composition during sintering. Table 2 lists the relative physical properties of the various compositions A-J of Table 1 after sintering. These will be discussed subsequently in greater detail.

Unmelted baddeleyite is available after processing baddeleyite containing ore through a heavy minerals separation plant. Baddeleyite ore concentrates thus provided are used as a "coarse grain size" ceramifiable component and may, if desired, also be used as "intermediate grain size" and "fine grain size" ceramifiable components of the composition. The typical chemistry of the baddeleyite ore concentrates which have been used are set forth in Table 3. All indicated percentages are again by weight. Ore concentrates with the indicated chemistry are presently available from South Africa.

The typical particle size distribution of the various baddeleyite ore concentrates grain size compositions (coarse, intermediate and fine) indicated in Table 1 are set forth in Table 4. The numbers in each of the three columns indicate the percentages by weight of the identified grain size composition which is finer than (i.e. passes through) the standard screen sizes indicated along the left hand margin under the heading "EFFECTIVE PARTICLE SIZE".

TABLE 1

| COMPOSITION % BY WEIGHT | EXEMPLARY COMPOSITIONS | | | | | | | | | |
|---|---|---|---|---|---|---|---|---|---|---|
| | (A) | (B) | (C) | (D) | (E) | (F) | (G) | (H) | (I) | (J) |
| 1. Baddeleyite Coarse Grain Concentrates | 43 | 63 | 53 | 48 | 43 | 43 | 43 | 43 | 43 | 43 |
| 2. Baddeleyite Intermediate Grain | 20 | | 10 | 15 | 20 | 20 | 20 | 20 | 20 | 20 |
| 3. Baddeleyite Fine Grain | | | | | 27 | | | | | |
| 4. Zirconia Flour (or Baddeleyite Fine Grain) | 27 | 27 | 27 | 27 | | 26 | 26 | 26.3 | 26.7 | 27.0 |
| 5. Grog (or Baddeleyite Coarse Grain) | 7 | 7 | 7 | 7 | 7 | 7 | 7 | 7 | 7 | 7 |
| 6. MgO | 2 | 2 | 2 | 2 | 2 | 2 | — | 2 | 2 | 2 |
| 7. $SiO_2$ | .2 | .2 | .2 | .2 | .2 | .2 | .2 | .2 | — | — |
| 8. $Al_2O_3$ | .5 | .5 | .5 | .5 | .5 | .5 | .5 | .5 | — | — |
| 9. Ball Clay | .3 | .3 | .3 | .3 | .3 | .3 | .3 | — | .3 | — |
| 10. Zircon | | | | | | 1 | 1 | 1 | 1 | 1 |
| 11. CaO | | | | | | | 2 | | | |

TABLE 2

| PHYSICAL PROPERTIES | PHYSICAL PROPERTIES OF EXEMPLARY COMPOSITIONS | | | | | | | | | |
|---|---|---|---|---|---|---|---|---|---|---|
| | (A) | (B) | (C) | (D) | (E) | (F) | (G) | (H) | (I) | (J) |
| Apparent Porosity %[1] | 14.8 | 18.4 | 19.1 | 18.8 | 16.1 | 14.3 | 17.8 | 18.0 | 17.9 | 20.6 |
| Bulk Density, lb/cu ft[1] | 299 | 285 | 287 | 286 | 295 | 302 | 291 | 291 | 291 | 282 |
| Bulk Density, gms/cc[1] | 4.79 | 4.57 | 4.60 | 4.58 | 4.73 | 4.84 | 4.66 | 4.66 | 4.66 | 4.52 |
| Modulus of Rupture[2] (Ambient Temp.) kg/cm.[2] | 540 | 350 | 420 | 430 | 400 | 510 | * | * | * | * |
| Modulus of Rupture[2] (Ambient Temp) psi | 7650 | 5000 | 6000 | 6100 | 5700 | 7200 | * | * | * | * |
| Thermal Shock Rating[3] | 2 | 4 | 4 | 4 | 2 | 10 | 8 | 6 | 5 | 5 |

[1]Measured in accordance with ASTM Procedure C20-74
[2]Measured in accordance with ASTM Procedure C133-72
[3]Based on cyling 1 in × 1 in × 3 in (2.54 cm. × 2.54 cm × 7.62 cm) bars from 1400° C. to ambient temperature. A subjective rating standard according to degree (extent and severity) of cracking and spalling, 1 representing the powest performance and 10 the highest performance
*Figures not available.

TABLE 3

| BADDELEYITE ORE CONCENTRATES CHEMISTRY | |
|---|---|
| $ZrO_2$ + $HfO_2$ | 98.0% |
| $TiO_2$ | .3% |
| $SiO_2$ | 1.0% |
| $Fe_2O_3$ | .08% |
| Loss on Ignition (at 700° C.) | .3% |
| Minor Constituents | .32% |

TABLE 4

| BADDELEYITE ORE CONCENTRATES GRAIN SIZE DISTRIBUTIONS | | | |
|---|---|---|---|
| | % Finer Than | | |
| EFFECTIVE PARTICLE SIZE | Coarse Fraction[1] | Intermediate Fraction[2] | Fine Fraction[3] |
| 48 mesh, Tyler | 97 | | |
| (259 micron) | | | |
| 100 mesh, Tyler | 70 | | |
| (147 microns) | | | |
| 200 mesh, Tyler | 25 | | |
| (75 microns) | | | |
| 325 mesh, Tyler | 5 | | |
| (44 microns) | | | |
| 40 microns | | 97 | |
| 30 microns | | 87 | |
| 20 microns | | 61 | |
| 10 microns | | 27 | 100 |
| 5 microns | | 12 | 92 |
| 3.7 microns | | | 76 |
| 2.6 microns | | | 56 |
| 1 micron | | | 23 |
| .5 micron | | | 6 |

[1]Determined on Ro-Tap using ASTM Procedure C-92.
[2]Determine on Micromeritics Sedigraph.
[3]Determined on L & N Microtrac.

It can be discerned from Tables 1 and 4 that a major proportion by weight of the refractory compositions of Table 1 is baddeleyite ore concentrates and that a major proportion by weight of the baddeleyite is present in the form of particles having an effective particle size greater than about 5 microns, distinguishing these compositions from the very fine grain baddeleyite ore concentrates compositions previously used.

Set forth in Table 5 is the typical chemistry of the artificial zirconia flour used. Again, the indicated percentages are by weight. The approximate distribution of particle sizes of the artificial zirconia flour used is set forth in Table 6. Again, the numbers in the right-hand column indicate the percentage by weight of the flour which is smaller than the effective particle size indicated in the left column. As noted in parenthesis in Table 1, baddeleyite fine grain fraction may be substituted for the artificial zirconia flour, if desired, to make an essentially pure baddeleyite composition. The physical properties in Table 2 are for compositions A through J, all except E using the artificial zirconia flour. It is believed that mixtures of artificial zirconia flour and baddeleyite fine grain fractions totaling the indicated percentages (27 or 26%) will also work successfully.

For economy, finished rejects of parts made (i.e. sintered) from this composition may be milled to produce a "grog" which may be added to the refractory compositions. An exemplary distribution in weight percent, of particle sizes of this material which has been found suitable is set forth in Table 7.

TABLE 5

| ZIRCONIA FLOUR CHEMISTRY | |
| --- | --- |
| $ZrO_2 + HfO_2$ | 99% |
| $SiO_2$ | .4% |
| CaO | .2% |
| MgO | .1% |
| $TiO_2$ | .1% |
| $Al_2O_3$ | .1% |
| $Fe_2O_3$ | .1% |

TABLE 6

| ZIRCONIA FLOUR PARTICLE SIZE DISTRIBUTION | |
| --- | --- |
| PARTICLE SIZE | % FINER THAN[1] |
| 7.5 microns | 100% |
| 5 microns | 90 |
| 3 microns | 50 |
| 2 microns | 25 |
| 1 microns | 4 |

[1]Determined on L & N Microtrac.

TABLE 7

| GROG PARTICLE SIZE DISTRIBUTION | |
| --- | --- |
| EFFECTIVE PARTICLE SIZE | % FINER THAN |
| 24 mesh, Tyler (700 microns) | 100% |
| 48 mesh, Tyler (259 microns) | 50 |
| 100 mesh, Tyler (147 microns) | 25 |

If rejects are not available or it is otherwise desired, it is believed that unmelted baddeleyite ore concentrates of the indicated coarse grain size distribution may be substituted for the rejects or a mixture of the two used for the indicated 7% values of Table 1.

One skilled in the art knows that grog made from previously fired articles will not shrink when subsequently sintered and thus may be used to control article shrinkage during firing. Greater amounts of grog, upwards to about 25% by weight of the cermifiable components of the refractory compositions may be desired or required in fabricating larger article shapes than those articles prepared to date by applicants while lesser amounts than the indicated 7% may be effectively employed in making such articles or smaller articles. Again, Table 2 indicates properties of compositions A through J sintered materials where grog in the indicated percentage was employed.

In order that the refractory compositions of the present invention provide the necessary resistance to thermal shock damage, the zirconium dioxide of the composition is partially stabilized, preferably while the composition is being sintered into an aggregate exhibiting an article shape. It is well known that zirconia may be stabilized to a cubic phase or structure by its combination with suitable stabilizing compositions at elevated temperatures. Zirconia will remain stabilized in a cubic phase even at room temperature. Magnesium oxide (MgO) is the preferred zirconia stabilizing composition employed in the described exemplary compositions but, as is illustrated by the composition (G) of Table 1, calcium oxide may be effectively employed. For convenience calcium carbonate is typically used to supply the calcium oxide. As the composition is heated, the calcium carbonate will break down into calcium oxide and carbon dioxide. It is envisioned that yttria or other zirconia stabilizers known in the art may be substituted for or mixed with the magnesium oxide to accomplish this result. A chemical grade magnesium oxide in the form of particles finer than 325 mesh, Tyler (44 microns) and containing at least 98% MgO by weight is preferred although the exact chemistry and particle size is believed to be non-critical. A comparable grade of calcium carbonate with corresponding purity is also preferred when used. An amount of calcium carbonate sufficient to yield a 2% by weight amount of CaO (approximately double the CaO weight) is provided. The zirconia stabilizing compositions have been added to the refractory compositions in amounts sufficient to partially stabilize the zirconium dioxide present in the composition by converting at least a portion of it to a cubic phase.

It has been observed that the baddeleyite ore concentrates particles exhibit a near theoretical density and interact poorly when combined solely with a zirconia stabilizing ingredient such as magnesium oxide or calcium oxide. For this reason a suitable stabilizer diffusing composition is desirably added to the refractory composition in an amount effective to assist these zirconia stabilizing compositions to enter the dense baddeleyite particles and thus increase the amount of zirconium dioxide converted to the cubic phase. In the described exemplary embodiments, small amounts of alumina ($Al_2O_3$) and silica ($SiO_2$) are added as sintering aids to enhance the diffusion of the selected zirconia stabilizer. A finely ground (less than 20 micron mesh fraction) silica flour containing at least about 98% by weight $SiO_2$ was used although it is believed fumed silica or other similar materials could be used as well. A reactive alumina, composed of approximately 99.7% $Al_2O_3$ by weight having a medium crystal size of about 1.5 microns was used in the compositions listed in Table 1. However, it is believed that a lesser grade of $Al_2O_3$ may perform equally well. Again, exact chemistry and particle sizes are believed to be non-critical to the success of the indicated batch mixture. The alumina and silica form, by what appears to be a solid state diffusion, the components of a near continuous phase refractory material at the sintering temperature of the exemplary refractory compositions of Table 1. This material appears to assist the magnesium oxide and calcium oxide in diffusing into the baddeleyite particles. The material further appears to reduce the porosity and increase the bonding strength between the particles of the resulting sintered article thereby improving its corrosion/erosion resistance. Compositions I and J of Table 1 illustrate that reducing or eliminating the alumina and silica content of the refractory composition reduces the performance of the resulting sintered product. Articles produced from composition I and J, however, are believed to be marginally satisfactory for most molten metal and glass applications.

Ball clay is used to enhance the pressing characteristics of the mix for article forming, particularly for difficult shapes and contributes to densification of the refractory composition. It may be replaced with organic plastisizers using techniques known in the art. The ball clay used had a content by weight of approximately 25% $Al_2O_3$ and 64% $SiO_2$ with a pyrometric cone equivalent of between about 29 and 31. All clay particulates had an effective particle size less than about 44 microns (i.e. or of a less than 325 mesh, Tyler fraction). Because of its silica and alumina content, it too acted as a stabilizer diffusion component.

It has been discovered by applicants that a relatively small amount of zircon added to the formulation enhances the resistance of the sintered aggregate to damage from thermal shock arising from the extreme and instantaneous temperature fluctuations which are typically encountered in molten metal and glass processing. A dry or milled zircon flour having a content of about 90% or more by weight $ZrSiO_4$ and an effective maximum particle size of about 44 microns or less (i.e. a less than 325 mesh, Tyler fraction) was used as this ingredient. The zircon dissociates into zirconia and silica below the sintering temperature (about 1675° C.) of the exemplary refractory compositions of Table 1. It is believed that other compositions decomposing into an oxide of hafnium or zirconium or both at a temperature below the sintering temperature of the refractory composition, may be effectively employed in place of the zircon to enhance the thermal shock damage resistance of articles formed from the baddeleyite ore concentrates refractory compositions of the present invention.

Processing of the sinterable, refractory compositions of Table 1 into a refractory article is straight forward. The coarse and intermediate grain fractions of the baddeleyite ore concentrates are thoroughly mixed with the dry binders (i.e. methyl cellulose and ceramic flour) and the fine dry fractions (baddeleyite fine grain and various ceramifiable flours) subsequently added. After mixing the dry components to substantial uniformity, water is added and blending is continued until a uniformly wet mixture is achieved. The indicated refractory compositions have been formed into article shapes by pressing (hydraulic, impact, isostatic and hand ramming). It is believed that by the modification (within the ordinary skill of ceramists) of the amounts and/or the types of plasticizer and binders and the use of additional processing agents, the indicated refractory compositions may be formed into suitable shapes by extrusion, casting and other conventional ceramic body forming techniques. After drying, the shape is heated until substantial sintering of the constituent ingredients is achieved thereby forming the article. In sintering, the coarse and intermediate grain baddeleyite and grog particles maintain their particular identity while the remainder of the fine grain ceramifiable components appear to form a near continuous phase ceramic material bonding to the larger baddeleyite and grog aggregate particles. This continuous phase is believed to be formed by solid state diffusion of the fine grain ceramifiable components and appears to contain minor secondary phases of alumina, silica and combinations thereof. Preferably, sintering is accomplished by uniformly heating the article to a temperature of at least 1675° C. or more. Preferably too, the article is not heated to so great a temperature as to cause softening (indicative of melting of the composition ingredients). Although the temperature at which softening begins will vary depending upon the composition selected and purity of the ingredients used, it has been observed to occur at about a temperature of 1850° C. for at least some of the identified compositions. I is believed that a major portion by weight of the resulting article is unmelted baddeleyite and grog particles having effective particle sizes, apart from the article aggregation, greater than about 15 microns. Smaller portions of the article are represented by the near continuous phase refractory material binding the larger particles and smaller particles which have maintained their identity. Moreover, there appears to be little if any grain growth of the larger particles. Thus all but the largest fraction of the grog particles and perhaps a few percent of the coarse grain baddeleyite fraction are greater than about 260 microns. A major proportion by weight of the unmelted baddeleyite particles present in the article aggregate retain effective particle sizes, apart from the aggregation, of less than about 150 microns.

Table 2 indicates representative values of apparent porosity, bulk density, modulus of rupture and relative thermal shock rating of comparable articles formed from the compositions A through J of Table 1. Composition F of Table 1 is preferred as combining high resistance to damage from both thermal shock and thermal cycling (repeated thermal shock) with the low porosity/high density physical characteristics and chemical compositions desired for erosion/corrosion resistance in molten metal flow environments. Continuous casting nozzles formed from composition F have demonstrated resistance to damage from thermal shock equal to or better than that of the highest quality artificial zirconia fabricated pieces available. The apparent porosity, bulk density, modulus of rupture and thermal shock rating of the other compositions of Table 1 which have been tested are set forth in Table 2. Composition F through J all include a minor proportion of zircon. In composition G, CaO (in the form of calcium carbonate) was substituted for MgO as the zirconia stabilizing composition and exhibited a somewhat lower density and reduced resistance to damage from thermal shock than did composition F. Poorer still were the performances of compositions I and J wherein the silica, alumina and ball clay components were individually or collectively eliminated. Compositions A through E indicate the relative performance of compositions without the zircon additive or its equivalent. Composition A is the non-zircon composition closest to the preferred composition F. Compositions B, C, and D, which illustrate variations in the percent-by-weight content of baddeleyite coarse grain and intermediate grain distributions of Composition A, exhibit higher apparent porosity and lower bulk density but improved resistance to damage from thermal shock compared with the composition A material performance. Composition E differs from composition A in that the former includes baddeleyite ore in a fine grain distribution in place of artificial zirconia flour. The fine grain baddeleyite ore obtained and used, however, was severely contaminated with iron from milling and it is unlcear whether the characteristics indicated in Table 2 will apply when a cleaner material is used. The performance of continuous casting nozzles fabricated from compositions A through E appeared adequate and approximately equal to the performance of currently available lower grade artificial zirconia nozzles.

The physical properties set forth in Table 2 were derived from laboratory generated samples. It will be appreciated that the properties indicated in Table 2 are merely representative and that variations will occur amoung particles formed from the same batch as well as among articles formed from different batches of the same selected composition, particularly under production conditions. Tables 8 and 9 lists physical properties and typical chemistry, respectively, of continuous casting nozzles produced from composition F in production size batch lots and under typical production conditions. As indicated, thermal shock resistance testing was performed upon a standard size sample bar.

TABLE 8

PRODUCTION ARTICLES
PHYSICAL PROPERTIES

| | |
|---|---|
| Apparent Porosity, %[1] | 17.0 |
| Bulk Density, lbs/ft$^3$[1] | 290 |
| Bulk Density, gms/cc[1] | 4.65 |
| Thermal Expansion[2] | |
| 600° C. | $13.0 \times 10^{-6}$ cm/cm °C. |
| 1000° C. | $12.2 \times 10^{-6}$ cm/cm °C. |
| 1300° C. | $6.7 \times 10^{-6}$ cm/cm °C. |
| Monoclinic Phase (% by weight)[4] | 20-80 |

[1]Measured in accordance with ASTM Procedure C20-74.
[2]Measured with a sapphire dilatometer.
[4]Determined by X-Ray diffraction analysis.

TABLE 9

PRODUCTION ARTICLES
TYPICAL CHEMISTRY (by weight)

| | |
|---|---|
| $ZrO_2 + HfO_2$ | 97% |
| MgO | 2% |
| $SiO_2$ | .5% |
| Other | .5% |

As has been previously stated, continuous casting nozzles for use in the processing of steel, crucibles for melting super alloys and other specialty products have been made as have other shapes such as slide gate inserts, bricks, rectangular bars, etc. It is believed the identified compositions will be useful in a wide variety of other refractory parts such as but not limited to pocket blocks, shrouds, sleeves, tuyere blocks, space blocks, etc. and other parts subject to molten metal, glass and slag corrosion/erosion environments.

It should be understood that while the present invention has been described and detailed with respect to certain illustrative specific embodiments thereof, it should not be considered limited to such compositions and methods of processing but may be used in other ways without departure from the spirit of the invention and the scope of the appended claims.

What is claimed is:

1. A process for producing a refractory article comprising:
   providing a sinterable refractory composition of zirconium dioxide comprising:
   a major proportion by weight of unmelted baddeleyite in the form of particles having effective particle sizes greater than about 5 microns;
   an amount of a zirconia stabilizing composition effective to convert at least a portion of the zirconium dioxide in the refractory composition to a cubic phase during sintering;
   a thermally decomposable composition, decomposable into an oxide of zirconium or an oxide of hafnium above about 100° C. and below a sintering temperature of the refractory composition, in an amount effective to improve the thermal shock resistance of said article;
   forming said composition into a shape; and
   heating said shape to a temperature and for a time sufficient substantially to sinter the shaped composition into said article.

2. The process of claim 1 wherein said thermally decomposable composition further comprises zircon.

3. The process of claim 2 wherein said zirconia stabilizing composition comprises magnesium oxide.

4. The process of claim 1 or 2 wherein said sinterable refractory composition further comprises:
   a minor proportion by weight of artificial zirconia.

5. The process of claim 1 wherein said sinterable refractory composition is in the form of a mixture of solid particles in a liquid, at least about 90% by weight of all of said solid particles having effective particle sizes less than about 260 microns.

6. The process of claim 5, further comprising, after said forming step, the step of substantially drying the shape and wherein said step of heating further comprises heating said shape at least to a temperature at which a minor proportion of the dried refractory composition forming said article forms into a near continuous phase refractory material binding to larger particles of the sintered composition.

7. The process of claim 1, 2 or 3 wherein said step of heating further comprises heating said shaped article to a temperature of at least about 1675° C. throughout.

8. The process of claim 1 wherein said sinterable refractory composition further comprises a binding composition in an amount effective to improve the formability of said sinterable refractory composition.

9. The process of claim 8 wherein said bind composition comprises a cellulose ether.

10. The method of claim 1 or 8 wherein said step of forming said composition into a shape comprises pressing said composition into said shape.

11. A process for producing a refractory article comprising the steps of:
    providing a sinterable composition of ceramifiable components comprising:
    from about 43 percent to about 70 percent by weight baddeleyite selected from the group consisting of coarse fraction unmelted baddeleyite grains, unmelted baddeleyite grog, and mixtures thereof;
    from 0 percent to about 20 percent by weight of intermediate fraction unmelted baddeleyite grains; and
    from about 26 percent to about 27 percent by weight of zirconium dioxide from the group consisting of fine fraction unmelted baddeleyite grains, zirconia flour, and mixtures thereof;
    forming said composition into a shape; and
    heating said shape to a temperature and for a time sufficient substantially to sinter the shape into said article.

12. The process of claim 11 wherein said refractory composition comprises:

from about 43 to 70 percent by weight coarse fraction unmelted baddeleyite grains;

from about 0 to 27 percent by weight unmelted baddeleyite grog; and the coarse fraction and the grog together not exceeding about 70 percent by weight of the sinterable composition.

13. An article produced in accordance with the process of claim 1, 2, 3, 5, 6, 8, 9 or 11.

14. A sinterable refractory composition of ceramifiable components comprising:

a major proportion by weight of zirconium dioxide;

a major proportion by weight of said zirconium dioxide being present in the form of unmelted baddeleyite particles having effective particle sizes greater than about 5 microns; and a composition thermally decomposable into an oxide of zirconium or hafnium at a temperature above about 100° C. but below a sintering temperature of said sinterable refractory composition in an amount effective to improve the thermal shock resistance of an article sintered from said refractory composition.

15. The sinterable refractory composition of claim 14 further comprising:

a zirconia stabilizing composition in an amount effective to convert a portion of the zirconium dioxide present in said refractory composition to a cubic phase during sintering.

16. The sinterable refractory composition of claim 15 wherein the thermally decomposable composition comprises zircon.

17. The sinterable refractory composition of claim 16 wherein said zircon comprises less than about 5% by weight of said refractory composition.

18. The sinterable refractory composition of claim 16 wherein said zircon comprises about 1% by weight of said refractory composition.

19. The sinterable refractory composition of claim 15 wherein said zirconia stabilizing composition comprises magnesium oxide.

20. A sinterable refractory composition of ceramifiable components comprising:

a major proportion by weight of zirconium dioxide in the form of unmelted baddeleyite particles having effective particle sizes greater than about 5 microns;

a zirconia stabilizing composition in an amount effective to convert a portion of the zirconium dioxide present in the refractory composition to a cubic phase during sintering; and a stabilizer diffusing composition in an amount effective to increase the amount of zirconium dioxide converted to a cubic phase when the refractory composition is sintered.

21. The sinterable refractory composition of claim 20 further comprising:

a composition thermally decomposable into an oxide of zirconium or hafnium at a temperature above about 100° C. but below a sintering temperature of said sinterable refractory composition in an amount effective to improve the thermal shock resistance of an article sintered from said refractory composition.

22. The sinterable refractory composition of claim 21 wherein said stabilizer diffusing composition is selected from the group consisting of alumina, silica and mixtures thereof.

23. The sinterable refractory composition of claim 22 wherein said thermally decomposable composition is zircon and said zirconia stabilizing composition is magnesium oxide.

24. The refractory composition of claim 14 further comprising:

a minor proportion by weight of artificial zirconia.

25. The refractory composition of claim 14 wherein said unmelted baddeleyite is selected from the group consisting of particles of baddeleyite ore concentrates, particles of aggregate containing at least a major proportion by weight of unmelted baddeleyite ore concentrates, and mixtures thereof.

26. A zirconia refractory article comprising:

a sintered aggregation of particles;

at least a major proportion by weight of said sintered aggregation being unmelted baddeleyite particles having effective particle sizes, apart from the aggregation, greater than about 15 microns; and the aggregation having a bulk density greater than 4.5 gms/cc.

27. The refractory article of claim 26 wherein said sintered aggregation further comprises a minor portion by weight of a near continuous phase ceramic material binding to said particles in said aggregation.

28. The refractory article of claim 26 or 27 wherein at least a major proportion by weight of said sintered aggregation is zirconium dioxide and at least a portion of said zirconium dioxide has a cubic phase structure.

29. The refractory article of claim 27 wherein at least a major proportion by weight of the unmelted baddeleyite particles have effective particle sizes, apart from the aggregation, of less than about 150 microns.

30. The refractory article of claim 29 wherein at least about 90% by weight of all of the unmelted baddeleyite particles of said aggregation have effective particle sizes, apart from the aggregation, of less than about 260 microns.

31. A zirconia refractory article comprising:

a sintered aggregation of particles, a major portion by weight of the aggregation being unmelted baddeleyite and grog particles having effective particle sizes, apart from the aggregation, greater than about 15 microns; and a minor proportion by weight of a near continuous phase ceramic material binding to said baddeleyite particles in said aggregation.

32. A refractory composition of ceramifiable components comprising:

from about 43 percent to about 70 percent by weight baddeleyite selected from the group consisting of coarse fraction unmelted baddeleyite grains, unmelted baddeleyite grog, and mixtures thereof;

from 0 percent to about 20 percent by weight of intermediate fraction unmelted baddeleyite grains; and from about 26 percent to about 27 percent by weight of zirconium dioxide from the group consisting of fine fraction unmelted baddeleyite grains, zirconia flour, and mixtures thereof.

33. The refractory composition of claim 32 comprising:

from about 43 to 70 percent by weight coarse fraction unmelted baddeleyite grains;

from about 0 to 27 percent by weight unmelted baddeleyite grog; and the coarse fraction and the grog together not exceeding about 70 percent by weight of the refractory composition.

* * * * *